(12) United States Patent
Byrne et al.

(10) Patent No.: US 7,170,979 B1
(45) Date of Patent: Jan. 30, 2007

(54) SYSTEM FOR EMBEDDING PROGRAMMING LANGUAGE CONTENT IN VOICEXML

(75) Inventors: William J. Byrne, Sunnyvale, CA (US); Mitsuru Oshima, Cupertino, CA (US); Michael Achenbach, Los Altos, CA (US); Beth A. Bottos, San Jose, CA (US); Dai Zhu, San Jose, CA (US)

(73) Assignee: Ben Franklin Patent Holding LLC, Bellevue, WA (US)

( * ) Notice: Subject to any disclaimer, the term of this patent is extended or adjusted under 35 U.S.C. 154(b) by 251 days.

(21) Appl. No.: 09/733,848

(22) Filed: Dec. 8, 2000

(51) Int. Cl.
 *H04M 11/00* (2006.01)
(52) U.S. Cl. ............................. 379/88.18; 379/201.03
(58) Field of Classification Search ........... 379/201.03, 379/76, 101.01, 88.18, 88.17, 88.04, 67; 704/270, 275, 257; 715/513
See application file for complete search history.

(56) References Cited

U.S. PATENT DOCUMENTS

| | | | | |
|---|---|---|---|---|
| 5,864,605 A | * | 1/1999 | Keshav | ................... 379/88.01 |
| 5,943,401 A | * | 8/1999 | Risner et al. | ............. 379/88.22 |
| 6,144,938 A | * | 11/2000 | Surace et al. | ................ 704/257 |
| 6,240,391 B1 | * | 5/2001 | Ball et al. | .................... 704/270 |
| 6,263,051 B1 | * | 7/2001 | Saylor et al. | ............. 379/88.17 |
| 6,269,336 B1 | * | 7/2001 | Ladd et al. | .................. 704/270 |
| 6,385,583 B1 | * | 5/2002 | Ladd et al. | .................. 704/270 |
| 6,463,461 B1 | * | 10/2002 | Hanson et al. | .............. 709/204 |
| 6,490,564 B1 | * | 12/2002 | Dodrill et al. | ............... 704/275 |
| 6,496,812 B1 | * | 12/2002 | Campaigne et al. | .......... 706/16 |
| 6,569,207 B1 | * | 5/2003 | Sundaresan | ................. 715/513 |
| 2002/0198719 A1 | * | 12/2002 | Gergic et al. | ................ 704/270 |

OTHER PUBLICATIONS

Voice eXtensible Markup Language, VoiceXML Version 1.00, Mar. 7, 2000, by VoiceXML Forum.*

* cited by examiner

*Primary Examiner*—Fan Tsang
*Assistant Examiner*—Simon Sing
(74) *Attorney, Agent, or Firm*—Sterne, Kessler, Goldstein & Fox P.L.L.C.

(57) ABSTRACT

A method for providing an interactive voice response service is provided. The method uses a VoiceXML interpreter in cooperation with a voice/audio application. The voice/audio application uses scripts coded in VoiceXML with embedded Java Server Pages (JSP). The use of VoiceXML along with JSP allows the present invention to provide an implementation that minimizes interaction between the voice/audio application and the VoiceXML server.

10 Claims, 2 Drawing Sheets

SYSTEM FOR EMBEDDING PROGRAMMING LANGUAGE CONTENT IN VOICEXML

CROSS-REFERENCE TO RELATED APPLICATION

This application is related to and incorporates by reference herein in its entirety the commonly owned and concurrently filed patent application: U.S. patent application Ser. No. 09/732,812 entitled "OPEN ARCHITECTURE FOR A VOICE USER INTERFACE" by Mitsura Oshima.

BACKGROUND OF THE INVENTION

Interactive voice response services are an increasingly common part of everyday life. Services of this type are used to provide everything from banking and credit card information to interactive driving systems. Interactive voice response services are also an increasingly popular way to access the World Wide Web. This is true in spite of the growing popularity of personal data assistants and web enabled cellular telephones. The nearly ubiquitous availability of telephones, and the ability to use voice in non-traditional environments (such as when driving) ensures that the popularity and diversity of interactive voice response services will continue to grow.

Voice extensible Markup Language (VoiceXML) is a response to the increasing use of interactive voice response services. VoiceXML is a language for scripting interactive voice response services.

As an example, consider the following VoiceXML fragment:

```
<vxml>
    <form>
        <block>
            <prompt>
                Hello, World!
            </prompt>
        </block>
    </form>
</vxml>
```

When processed by a VoiceXML interpreter, the prompt portion of the script plays text-to-speech (TTS) "Hello, World!"

VoiceXML fragments of this type have proven to be a flexible mechanism for accomplishing many tasks. At the same time, there are important cases where VoiceXML is lacking in required flexibility. Consider, for example, the case of an interactive voice response email service. Designers of this type of service might wish to generate a prompt that welcomes each user by name and tells them how many emails they have received since their last visit (e.g., "Hello Mr. Smith, you have ten new emails."). Unfortunately, this type of prompt requires dynamic generation—it includes fields that must be changed to match each user and each number of new emails.

In fact, the non-dynamic nature of VoiceXML contributes to a range of implementation difficulties. These difficulties become more severe (in most cases) in more complex VoiceXML applications. As a result, there is a need for systems that include dynamic content in VoiceXML and similar languages. This need is particularly important for complex interactive voice response services.

SUMMARY OF THE INVENTION

An embodiment of the present invention provides a method for providing an interactive voice response service. The method uses a VoiceXML interpreter in cooperation with a voice/audio application. The voice/audio application uses scripts coded in VoiceXML with embedded Java Server Pages (JSP). The use of VoiceXML along with JSP allows the present invention to provide an implementation that minimizes interaction between the voice/audio application and the VoiceXML server.

In one embodiment, the invention relates to a method for providing an interactive voice response service includes the steps of: creating a pool of audio prompts, subdividing the pool into segments, generating code to randomly select prompts from one of the segments, and sending the generated code to a Voice XML interpreter.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The preferred embodiments of the present invention and their advantages are best understood by referring to FIGS. 1 through 4 of the drawings. Like numerals are used for like and corresponding parts of the various drawings.

Environment

Figure 1:
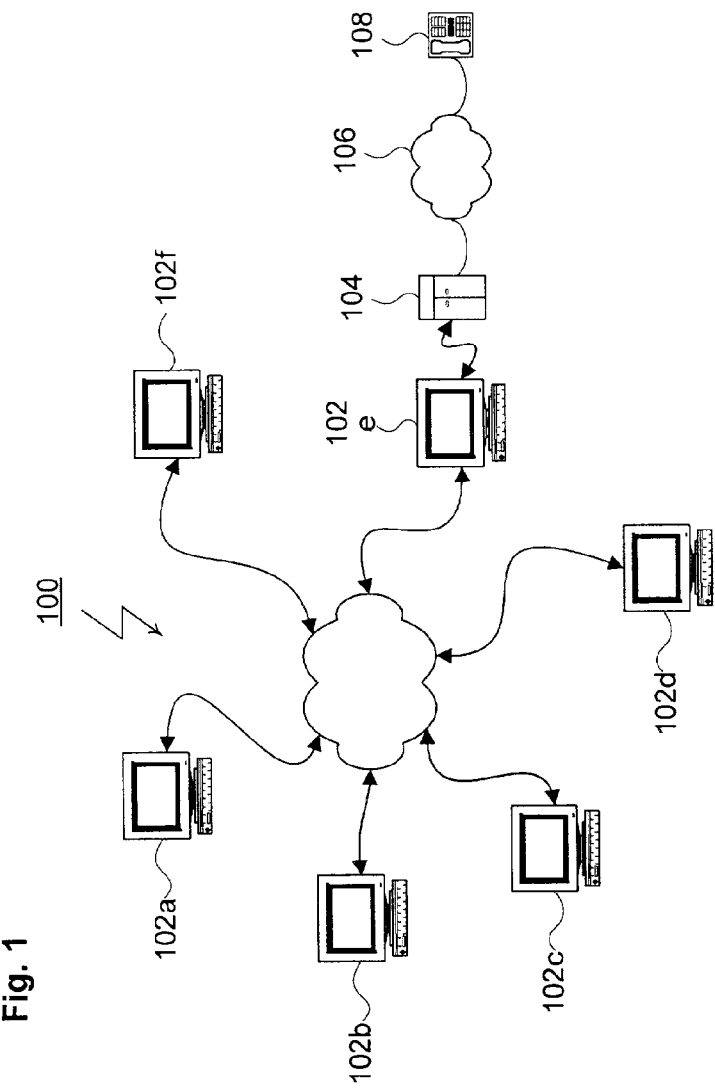
FIG. 1 is a block diagram of a computer network shown as a representative environment for an embodiment of the present invention.

In FIG. 1, a computer network 100 is shown as a representative environment for an embodiment of the present invention. Computer network 100 is intended to be representative of the complete spectrum of computer network types including Internet and Internet-like networks. Computer network 100 includes a number of computer systems, of which computer system 102a through 102f are representative. Computer systems 102 are intended to be representative of the wide range of large and small computer and computer-like devices that are used in computer networks of all types. Computer systems 102 are specifically intended to include non-traditional computing devices such as personal digital assistants and web-enabled cellular telephones.

Figure 2:
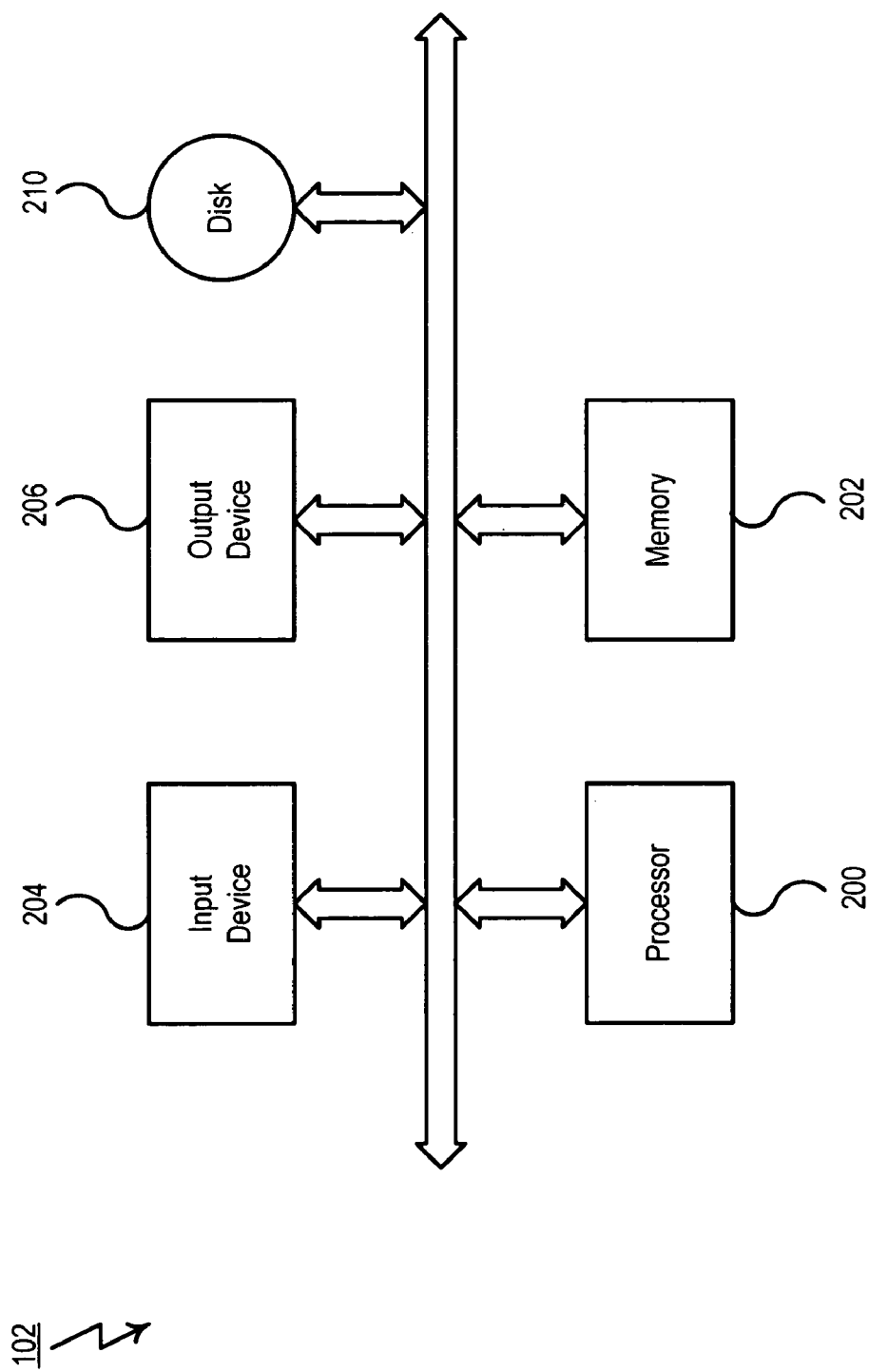
FIG. 2 is a block diagram of a computer system as may be used in the network of FIG. 1.

FIG. 2 shows a representative implementation for computer systems 102. Structurally, each computer system 102 includes a processor, or processors 200, and a memory 202. Processor 200 can be selected from a wide range of commercially available or custom types. An input device 204 and an output device 206 are connected to processor 200 and memory 202. Input device 204 and output device 206 represent all types of I/O devices such as disk drives, keyboards, modems, network adapters, printers and displays. Each computer system 102 may also includes a disk drive 210 of any suitable disk drive type (equivalently, disk drive 210 may be any non-volatile mass storage system such as "flash" memory).

Computer network 100 also includes a telephony subsystem 104. Telephony subsystem 104 may be implemented as a separate system (as shown in FIG. 1) or, more typically, as a card included in one of computer systems 102. In either case, telephony subsystem 104 is connected to receive commands and data from computer system 102e. Telephony subsystem 104 is also connected to a telephone network 106. Telephone network 106 is connected, in turn to a telephone 108.

Figure 3:
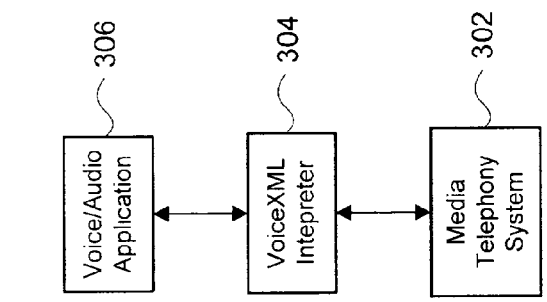
FIG. 3 is a block diagram showing a set of software components deployed in the network of FIG. 1.

Computer network includes a series of software processes. As shown in FIG. 3, these include media telephony speech (MTS) 302, VoiceXML interpreter 304 and one or more voice/audio applications 306.

MTS 302 is hosted by computer system 102e and interacts with telephony subsystem 104. MTS 302 provides one or more high-level interfaces to telephony subsystem 104, such as telephony, text-to-speech and speech recognition and prompt playing. Software processes in computer network 100 typically interact with telephony subsystem 104 through MTS 302.

VoiceXML interpreter 304 and voice/audio application 306 are hosted (together or separately) by one or more computer systems 102 in computer network 100. VoiceXML interpreter 304 sends requests to voice/audio application 306. Voice/audio application 306 sends VoiceXML responses to VoiceXML interpreter 304. VoiceXML interpreter 304 interprets the VoiceXML responses and forwards the interpreted results to MTS 302.

The combination of MTS 302, VoiceXML interpreter 304 and voice/audio application 306 provides an interactive voice interface for voice/audio application 306. Users access MTS 302 through telephone network 106 and telephony system 104. This access is bi-directional—users can both issue verbal/audio requests and receive verbal/audio responses. MTS passes user requests to VoiceXML interpreter 304 where they are translated into HTTP requests and passed to voice/audio application 306. Voice/audio application 306 responds to the HTTP requests with VoiceXML responses. Voice/audio application 306 sends these responses to VoiceXML interpreter 304 where they are translated into calls to MTS 302. MTS 302 passes these responses, in turn to telephony system 104 telephone network 106 and eventually, the user.

In general, it should be appreciated that the specific network of FIG. 1, computer system of FIG. 2 and software components of FIG. 3 are all intended to describe a representative environment for a VoiceXML interpreter. Other, equally suitable environments may include these or other components. The specific functions of each component may also vary between different environments. Additional details of the representative environment of FIGS. 1 through 3 are described in a copending US Application entitled "Open Architecture for a Voice User Interface." That disclosure is incorporated in this document by reference.

System for Embedding Programming Language Content in VoiceXML

Voice/audio application 306 uses a series of enhanced VoiceXML scripts. The enhanced VoiceXML scripts may include embedded elements of a high-level language. Voice/audio application 306 processes each script before sending it to VoiceXML interpreter 304 or in response to requests from VoiceXML interpreter 304. Voice/audio application 306 executes each high-level language (HLL) element as it is encountered during this processing.

As an example, consider the following VoiceXML fragment:

```
<vxml>
    <form>
        <block> You have email from <%=msg.getFrom( )>%,
received at <%=msg.getDate( )%>. Subject is
<%=msg.getSubject( )%>
        </block>
    </form>
</vxml>
```

During processing, Voice/audio application 306 scans for the tokens "<%=" and "%>". Voice/audio application 306 treats text enclosed by these tokens as EL expressions. Voice/audio application 306 evaluates (interprets) each HLL expression as it is encountered. Voice/audio application 306 replaces each HLL expression with its evaluated value.

After executing and replacing each HLL expression, the preceding fragment would have a form similar to:

```
<vxml>
    <form>
        <block> You have email from Joe Smith, received at 4 am.
Subject is airplane delay
        </block>
    </form>
</vxml>
```

After processing, voice/audio application 306 sends the resulting script to VoiceXML interpreter 304. VoiceXML interpreter then interprets the updated VoiceXML fragment.

The process of token recognition, HLL expression execution and HLL expression replacement can be adapted to a range of different languages. The examples used in this description focus on the use of the Java programming language and the use of Java Server Pages (JSP) in particular. Java and JSP have the advantage of being widely adopted within the Internet programming environment.

The definition for Java Server Pages includes a range of tokens and directives. These include:

| | |
|---|---|
| <%= Expression %> | Voice/audio application 306 evaluates expression and replaces it with the resulting value. |
| <% code %> | Voice/audio application 306 inserts code into the service method. |
| <%! Code %> | Voice/audio application 306 inserts code into the body of servlet class, outside of service method. |
| <%@ page att="val" %> | General setup directions for Voice/audio application 306. |
| <%@ include file="url" %> | Voice/audio application 306 includes the contents of the file identified by URL. |
| <%-- comment text --%> | Voice/audio application 306 ignores text between <%-- and --%>. |
| <jsp:useBean att=val /> | Voice/audio application 306 finds or builds a Java Bean. |
| <jsp:setProperty att="val" /> | Voice/audio application 306 sets bean properties. |
| <jsp:getProperty name="propertyName" value="val" /> | Voice/audio application 306 finds and outputs bean properties. |
| <jsp:forward page="URL" /> | Voice/audio application 306 forwards request to designated page. |

-continued

| | |
|---|---|
| <jsp:plugin attribute="val" /> | Voice/audio application 306 generates code to request that an applet be run using a Java plugin. |

Voice/audio application 306 can be configured to support all or a subset of these directives. The addition of Java Server Pages to VoiceXML provides a flexible framework for constructing voice applications. The efficiency of applications created with this framework can be greatly enhanced by creating VoiceXML scripts in a way that reduced interaction between VoiceXML interpreter 304 and voice/audio application 306. Each of the following examples has been selected with this consideration in mind. Code for the following examples is attached as Appendix A.

EXAMPLE ONE

```
<jsp:useBean id="random"
class="com.genmagic.util.RandomPrompt">
    <jsp:setProperty name="random" property="addPrompt"
        value="hello_1.wav"/>
    <jsp:setProperty name="random" property="addPrompt"
        value="hello_2.wav"/>
    <jsp:setProperty name="random" property="addPrompt"
        value=!"hello_3.wav"/>
    . . .
    <jsp:setProperty name="random" property="addPrompt"
        value="hello_29.wav"/>
    <jsp:setProperty name="random" property="addPrompt"
        value="hello_30.wav"
</jsp:useBean>
```

Execution of this fragment causes voice/audio application 306 to create a pool of audio files. In this case, thirty files are created but the same methods could be used with any number of files. This Java implementation for RandomPrompt subdivides the pool of files into segments. For this particular example, it may be assumed that six segments of five files are created.

VoiceXML scripts can generate code to select prompts from the prompt pool by including the expression:

```
<jsp:getProperty name="random" property="prompt"/>
```

During interpretation, Voice/audio application 306 replaces the getProperty directive with VoiceXML of the form:

```
<var name="tmp" expr="Math.random( )*4"/>
<if cond="1.0>=tmp">
<audio src="builtin:hello_5.wav"/>
<elseif cond="2.0>=tmp"/>
<audio src="builtin:hello_6.wav"/>
<elseif cond="3.0>=tmp"/>
<audio src="builtin:hello_7.wav"/>
<elseif cond="4.0>=tmp"/>
<audio src="builtin:hello_8.wav"/>
<elseif cond="5.0>=tmp"/>
<audio src="builtin:hello_9.wav"/>
</if>
```

Execution of this code causes VoiceXML interpreter 304 to randomly select an audio prompt from a segment within the pool of audio prompts. This segment of code can be executed multiple times with the prompt chosen varying between the five prompts included in the segment. Each re-execution is accomplished without further interaction between VoiceXML interpreter 304 and voice/audio application 306.

EXAMPLE TWO

```
<jsp:useBeanidshuffle" class="ShufflePrompt">
    <jsp:setProperty name="shuffle" property="addPrompt"
        value="hello_1.wav"/>
    <jsp:setProperty name="shuffle" property="addPrompt"
        value="hello_2.wav"/>
    <jsp:setProperty name="shuffle" property="addPrompt"
        value="hello 3.wav"/>
    <jsp:setProperty name**"shuffle" property="addPrompt"
        value="hello_29.wav"/>
    <jsp:setProperty name="shuffle" property="addPrompt"
        value="hello_30.wav"/>
<jsp:useBean>
```

Execution of this fragment caused Voice/audio application 306 to create a pool of audio files. In this case, thirty files are created but the same methods could be used with any number o files. This Java implementation for ShufflePrompt subdivided the pool of files into segments. For this particular example, if may be assumed that six segments of five files are created; Each segment includes a shuffled sequence-of audio prompts. Thus, one segment might include audio prompts 2, 24, 21, 7 and 10. Each segment is created without duplicate entries.

VoiceXML scripts can generate code to select prompts from the prompt pool by including the expression:

```
<jsp:getProperty name=shuffle" property="prompt"/>
```

During interpretation, voice/audio application 306 replaces the getProperty directive with VoiceXML of the form:

```
<var name="tmp" expr="tmp+1"/>
<if cond="tmp==6">
<assign name="tmp" expr="1"/>
</if>
<if cond="1==tmp">
<audio src="builtin:hello_29.wav"/>
<elseif cond="2 tmp"/>
<audio src="builtin:hello_3.wav"/>
<elseif cond="3==tmp"/>
<audio src="builtin:hello_15.wav"/>
<elseif cond="4==tmp"/>
<audio src="builtin:hello_11.wav"/>
<elseif cond="5==tmp"/>
<audio src="builtin:hello_7.wav"/>
</if>
```

The expanded code implicitly selects one of the segments from the pool of audio prompts. The first execution of this code by VoiceXML interpreter 304 causes the first prompt in the selected segment to be played. Subsequent executions cause the remaining prompts to be played in order. Each re-execution is accomplished without further interaction between VoiceXML interpreter 304 and voice/audio application 306.

EXAMPLE THREE

```
<field name="next">
<field>
<% if (mail.isLast( )) { %>
    <prompt> That was the last one </prompt>
<% } else { %>
    <goto next="email.jsp#event=nextMail"/>
<% } %>
</field>
```

This fragment is intended to be used to help an application (and user) navigate within a variable length list of audio prompts. Lists of this type are used in applications where the number of prompts is not fixed. An example might be a voice email application that uses different prompts for different items in a user's inbox. Since the number of inbox items changes, the list of prompts has no fixed length.

The VoiceXML fragment is configured so that VoiceXML interpreter 304 firsts tests to determine if the end of the list has been reached (i.e., there is no next item. Only if this condition is false, does the Voice XML interpreter 304 retrieve the next item from voice/audio application 306. This avoids interaction between VoiceML interpreter 304 and voice/audio application 306 if there no next item.

EXAMPLE FOUR

This example applies to user interfaces that support multiple domains. User interfaces of this type are intended to allow users to perform multiple unrelated tasks, such as a reading email, listening to news and performing stock transactions. This type of application works best where the user is able to move randomly between domains (i.e., there is no preset order required).

In applications of this type, VoiceXML scripts do not know the identity of the next domain to be visited. This information can be generated by adding the expression:

<goto next="domainjsp#event=nextDomain"/>

The following VoiceXML fragment can be used to generate different prompts for multiple domain user interfaces. The fragment causes VoiceXML interpreter to generate an initial prompt for a user's first visit to a domain. A secondary prompt is used for each subsequent visit.

<% if (domain.isCurrentDomainVisited( )==false) { %>
<prompt>You have 3 new messages and old messages</prompt>
<% } else { %>
<prompt>You returned back to email. </prompt>
<% } %>

EXAMPLE FIVE

This example applies to systems that support multiple services (i.e., multiple voice/audio applications 306). Systems of this type work best if VoiceXML interpreter 304 performs initial routing for each incoming call. To perform this type of routing, a VoiceXML fragment of the following type may be used.

<% if (DNIS.startsWith("800123")) { %>
<goto next="http://banking.genmagic.com/bankingService.jsp"/>
<% } else if (ANI.equals("4087744485")) { %>
<goto next="http://my.genmagic.com/oshimajsp"/>
<% } %>

This fragment causes VoiceXML interpreter to examine information about incoming calls. This information may include Direct Number Identification (DNIS), Automatic Number Identification (ANI) and User to User Identification (UUI) information. In each case, the information can be used to direct incoming calls to one or more voice/audio application 306.

<jsp:useBean id="router" class="com.genmagic.util.Router"/>
<jsp:setProperty name="router" property="dnis" param="dnis"/>
<jsp:setProperty name="router" property="ani" param="ani"/>
<jsp:setProperty name="router" property="uui" param="uui"/>
<% if (router.isServiceFor("onstar")) { %>

<goto next="http://onstar.genmagic.com/loginjsp"/>
<% } else if (router.isServiceFor("bank")) { %>
<goto next="http://banking.genmagic.con/bankingServicejsp"/>
<% } %>

CONCLUSION

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method for providing an interactive voice response service, comprising:
  selecting a script composed in accordance with a language for scripting interactive voice response services and having embedded therein an element of a high-level programming language;
  processing the script, wherein processing the script includes executing the element of the high-level programming language to dynamically generate a script fragment composed in accordance with the language for scripting interactive voice response services and replacing the element of the high-level programming language with the generated script fragment to provide a processed script; and
  interpreting the processed script to generate a voice response, wherein interpreting the processed script includes interpreting the generated script fragment;
  wherein interpreting the generated script fragment includes randomly selecting an audio prompt from a set of audio prompts.

2. A method for providing an interactive voice response service, comprising:
  selecting a script composed in accordance with a language for scripting interactive voice response services and having embedded therein an element of a high-level programming language;
  processing the script, wherein processing the script includes executing the element of the high-level programming language to dynamically generate a script fragment composed in accordance with the language for scripting interactive voice response services and replacing the element of the high-level programming language with the generated script fragment to provide a processed script; and
  interpreting the processed script to generate a voice response, wherein interpreting the processed script includes interpreting the generated script fragment;
  wherein interpreting the generated script fragment comprises selecting an audio prompt from a set of audio prompts in accordance with a predetermined selection order.

3. A method for providing an interactive voice response service, comprising:
  selecting a script composed in accordance with a language for scripting interactive voice response services and having embedded therein an element of a high-level programming language;
  processing the script, wherein processing the script includes executing the element of the high-level programming language to dynamically generate a script fragment composed in accordance with the language for scripting interactive voice response services and replacing the element of the high-level programming language with the generated script fragment to provide a processed script; and interpreting the processed script to generate a voice response, wherein interpreting the processed script includes interpreting the generated script fragment;

wherein interpreting the generated script fragment comprises selecting an audio prompt from a variable length list of audio prompts after determining that the end of the variable length list has not been reached.

4. A method for providing an interactive voice response service, comprising:

selecting a script composed in accordance with a language for scripting interactive voice response services and having embedded therein an element of a high-level programming language;

processing the script, wherein processing the script includes executing the element of the high-level programming language to dynamically generate a script fragment composed in accordance with the language for scripting interactive voice response services and replacing the element of the high-level programming language with the generated script fragment to provide a processed script; and interpreting the processed script to generate a voice response, wherein interpreting the processed script includes interpreting the generated script fragment;

wherein interpreting the generated script fragment comprises selecting a first audio prompt if it is determined that a user interaction is a first user interaction within a domain and selecting a second audio prompt if it is determined that the user interaction is not a first user interaction within the domain.

5. A method for providing an interactive voice response service comprising:

selecting a script composed in accordance with a language for scripting interactive voice response services and having embedded therein an element of a high-level programming language;

processing the script, wherein processing the script includes executing the element of the high-level programming language to dynamically generate a script fragment composed in accordance with the language for scripting interactive voice response services and replacing the element of the high-level programming language with the generated script fragment to provide a processed script; and interpreting the processed script to generate a voice response, wherein interpreting the processed script includes interpreting the generated script fragment;

wherein interpreting the generated script fragment comprises routing an incoming call to one or more application programs.

6. An interactive voice interface comprising:

an application program adapted to select and process a script wherein the script is composed in accordance with a language for scripting interactive voice response services and has embedded therein an element of a high-level programming language and wherein processing the script includes executing the element of the high-level programming language to dynamically generate a script fragment composed in accordance with the language for scripting interactive voice services and replacing the element of the high-level programming language with the generated script fragment to generate a processed script; and an interpreter adapted to interpret the processed script to generate a voice response, wherein the interpreter is adapted to interpret the generated script fragment;

wherein interpreting the generated script fragment comprises randomly selecting an audio prompt from a set of audio prompts.

7. An interactive voice interface comprising:

an application program adapted to select and process a script wherein the script is composed in accordance with a language for scripting interactive voice response services and has embedded therein an element of a high-level programming language and wherein processing the script includes executing the element of the high-level programming language to dynamically generate a script fragment composed in accordance with the language for scripting interactive voice services and replacing the element of the high-level programming language with the generated script fragment to generate a processed script; and an interpreter adapted to interpret the processed script to generate a voice response, wherein the interpreter is adapted to interpret the generated script fragment;

wherein interpreting the generated script fragment comprises selecting an audio prompt from a set of audio prompts in accordance with a predetermined selection order.

8. An interactive voice interface comprising:

an application program adapted to select and process a script wherein the script is composed in accordance with a language for scripting interactive voice response services and has embedded therein an element of a high-level programming language and wherein processing the script includes executing the element of the high-level programming language to dynamically generate a script fragment composed in accordance with the language for scripting interactive voice services and replacing the element of the high-level programming language with the generated script fragment to generate a processed script; and an interpreter adapted to interpret the processed script to generate a voice response, wherein the interpreter is adapted to interpret the generated script fragment;

wherein interpreting the generated script fragment comprises selecting an audio prompt from a variable length list of audio prompts after determining that the end of the variable length list has not been reached.

9. An interactive voice interface comprising:

an application program adapted to select and process a script wherein the script is composed in accordance with a language for scripting interactive voice response services and has embedded therein an element of a high-level programming language and wherein processing the script includes executing the element of the high-level programming language to dynamically generate a script fragment composed in accordance with the language for scripting interactive voice services and replacing the element of the high-level programming language with the generated script fragment to generate a processed script; and an interpreter adapted to interpret the processed script to generate a voice response, wherein the interpreter is adapted to interpret the generated script fragment, wherein interpreting the generated script fragment comprises selecting a first audio prompt if it is determined that a user interaction is a first user interaction within a domain and selecting a second audio prompt if it is determined that the user interaction is not a first user interaction within the domain.

10. An interactive voice interface comprising:

an application program adapted to select and process a script wherein the script is composed in accordance with a language for scripting interactive voice response services and has embedded therein an element of a high-level programming language and wherein processing the script includes executing the element of the high-level programming language to dynamically generate a script fragment composed in accordance with the language for scripting interactive voice services and replacing the element of the high-level programming language with the generated script fragment to generate a processed script; and an interpreter adapted to interpret the processed script to generate a voice response, wherein the interpreter is adapted to interpret the generated script fragment;

wherein interpreting the generated script fragment comprises routing an incoming call to one or more application programs.

* * * * *